United States Patent
Kulkarni et al.

(10) Patent No.: US 9,719,338 B2
(45) Date of Patent: Aug. 1, 2017

(54) DETERMINING FRACTURING RHEOLOGICAL BEHAVIOR OF FRACTURING FLUIDS

(71) Applicant: Halliburton Energy Services, Inc., Houston, TX (US)

(72) Inventors: Pandurang Manohar Kulkarni, Houston, TX (US); Andrey Filippov, Houston, TX (US); Harold Grayson Walters, Tomball, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 832 days.

(21) Appl. No.: 14/019,347

(22) Filed: Sep. 5, 2013

(65) Prior Publication Data

US 2015/0066452 A1 Mar. 5, 2015

(51) Int. Cl.
  *G06G 7/48* (2006.01)
  *E21B 43/26* (2006.01)
  *C09K 8/62* (2006.01)

(52) U.S. Cl.
  CPC .............. *E21B 43/26* (2013.01); *C09K 8/62* (2013.01)

(58) Field of Classification Search
  CPC .... B01F 17/0021; E21B 49/006; E21B 43/26; G01V 99/005; C09K 8/035; C09K 8/12; C09K 8/265
  See application file for complete search history.

(56) References Cited

U.S. PATENT DOCUMENTS

| | | | | |
|---|---|---|---|---|
| 2004/0067855 A1* | 4/2004 | Hughes | ............... | B01F 17/0021 507/200 |
| 2010/0071957 A1* | 3/2010 | Huang | ..................... | C09K 8/12 175/65 |
| 2010/0314118 A1* | 12/2010 | Quintero | ................ | C09K 8/035 166/308.1 |
| 2011/0071056 A1* | 3/2011 | Saini | ..................... | C09K 8/035 507/119 |
| 2011/0083902 A1* | 4/2011 | Huang | ..................... | C09K 8/12 175/65 |

(Continued)

OTHER PUBLICATIONS

Walters, Harold G., et al., "Kinetic Rheology of Hydraulic Fracturing Fluids," SPE 71660, 2001 SPE Annual Technical Conference and Exhibition, Sep. 30-Oct. 3, 2001, 12 pages.

(Continued)

*Primary Examiner* — Kandasamy Thangavelu
(74) *Attorney, Agent, or Firm* — John W. Wustenberg; Parker Justiss, P.C.

(57) ABSTRACT

In one example of determining fracturing rheological behavior of fracturing fluids, a reference viscosity and fluid properties of a fracturing fluid are received. A fracturing rheological behavior of the fracturing fluid is modeled using a fluid model that models the fracturing rheological behavior of Newtonian and non-Newtonian fluids based, in part, on the received reference viscosity and the received fluid properties of the fracturing fluid. The fracturing rheological behavior of the fracturing fluid is provided. If a fracturing fluid is a mixture of two or more fracturing fluids, then a rheological behavior of the mixture is modeled based on a mixing rheological model. The fracturing rheological behavior of the mixture is then modeled based on the rheological behavior modeled by the mixing rheological model.

14 Claims, 9 Drawing Sheets

(56) References Cited

U.S. PATENT DOCUMENTS

| | | | |
|---|---|---|---|
| 2012/0181033 A1* | 7/2012 | Saini | C09K 8/265 |
| | | | 166/308.1 |
| 2012/0232859 A1* | 9/2012 | Pomerantz | G01V 99/005 |
| | | | 703/2 |
| 2013/0124178 A1* | 5/2013 | Bowen | E21B 43/26 |
| | | | 703/10 |
| 2013/0204588 A1* | 8/2013 | Copeland | E21B 43/26 |
| | | | 703/2 |
| 2013/0220604 A1* | 8/2013 | El-Rabaa | E21B 49/006 |
| | | | 166/259 |
| 2014/0014338 A1* | 1/2014 | Crews | E21B 43/26 |
| | | | 166/280.1 |

OTHER PUBLICATIONS

Lee, Seungjun, et al., "Development of a Comprehensive Rheological Property Database for EOR Polymers," SPE 124798, 2009 SPE Annual Technical Conference and Exhibition, Oct. 4-7, 2009, 14 pages.

* cited by examiner

DETERMINING FRACTURING RHEOLOGICAL BEHAVIOR OF FRACTURING FLUIDS

TECHNICAL FIELD

This disclosure relates to fracturing fluids that can be flowed through formations.

BACKGROUND

Oil and gas wells produce crude oil, natural gas and/or byproducts from subterranean hydrocarbon reservoirs. Such reservoirs can include finite-dimensional, discontinuous, inhomogeneous, anisotropic, non-elastic (DIANE) rock formations. In their natural state, i.e., prior to any fracture treatment, such formations are characterized by natural fractures and faults of various sizes, shapes and orientations. Hydraulic fracturing can be implemented to improve the conductivity of products through the hydrocarbon reservoirs. In fracturing, a pressurized fluid is used to form fractures in a low-permeability rock. Proppants, e.g., solid particles, are then used to keep the fractures open.

Modeling the fracturing process, e.g., using computer-implemented software models, can enable developing an efficient design for the process, and also efficient analysis and optimization of the process. A hydraulic fracture model can be based on, for example, fracture propagation, rock deformation, fluid flow, and proppant transport. Such models can be implemented to model fracturing in unconventional reservoirs, e.g., shale and tight gas reservoirs, in which the induced fractures interact with natural fractures resulting in the formation of a discrete, complex fracture network. A parameter that affects the hydraulic fracture model is the fracturing rheological behavior of the fracturing fluid, e.g., the fracturing fluid viscosity.

BRIEF DESCRIPTION OF THE DRAWINGS

Like reference numbers and designations in the various drawings indicate like elements.

DETAILED DESCRIPTION

This disclosure relates to determining fracturing rheological behavior of fracturing fluids. Fracturing fluids can be Newtonian or non-Newtonian fluids, may or may not include proppants or other additives, and can be implemented in a wide range of operating conditions, e.g., shear rate, temperature, pressure, and other similar conditions. Fracturing fluids can be classified as water-based fluids, acids, linear gels, cross-linked gels, and other treatment fluids. The fracturing rheological behavior of a fracturing fluid describes the fracturing fluid's properties that enable a formation (i.e., creation) of the fracture network or maintenance of the fracture network subsequent to forming or combinations of them. The techniques described here can be implemented as a generic fluid model that can predict the fracturing rheological behavior of different fracturing fluids.

In some formations, e.g., unconventional reservoirs, the fracture treatment can be implemented in multiple stages. Different fracturing fluids can be used for the different stages, and sometimes in the same stage. For example, initial fracturing (or "fracking") can be performed using a friction reducer fluid and subsequent fracturing can be implemented using a gelled/viscous fluid for efficient proppant transport. As the fracture network develops, two or more fracturing fluids coming in from different streams can mix at one or more fracture junctions. A mixture of miscible fracturing fluids can combine to have fracturing rheological behavior that may be different from that of each fracturing fluid in the mixture. This disclosure also describes techniques to model the fracturing rheological behavior of such a mixture of two or more fracturing fluids.

The fluid model described here can be implemented to model and validate the complete rheological behavior, including the fracturing rheological behavior, of multiple fracturing fluids including Newtonian and non-Newtonian fracturing fluids. The fracturing fluids can be of different types, e.g., water, diesel, base gel, cross-linked gel and other fracturing fluid types. As described below, the fluid model can be based on an input variable that includes a reference viscosity of the fracturing fluid at a specified shear rate and a specified temperature. The fluid model can receive the reference viscosity as a primary input parameter instead of, e.g., gel concentration. The fluid model can be based on multiple fluid properties of the fracturing fluid including, e.g., age, temperature, pressure, salinity, shear rate, hydration time, gel concentration (when the fracturing fluid is a gel), cross-linker chemistry (when the fracturing fluid is cross-linked) such as thermal kinetics, proppant information (including, e.g., proppant concentration), and proppant and foam internal phase fractions (when the fracturing fluid includes proppants).

Figure 1:
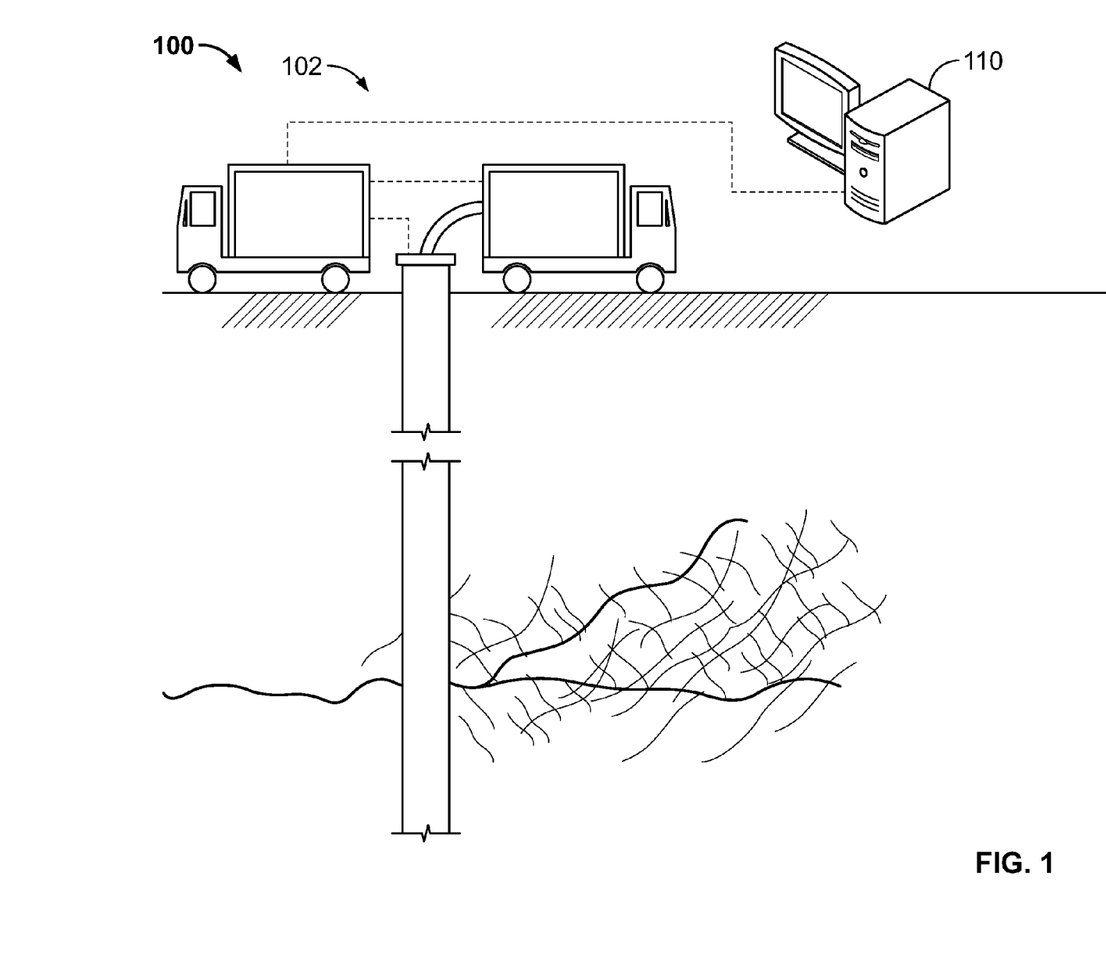
FIG. 1 illustrates an example well system.

FIG. 1 illustrates an example well system 100. The example well system 100 includes a treatment well 102 and/or one or more additional treatment wells. The well system 100 can include a computer system 110, which can include one or more computing devices located at one or more well sites and/or at one or more remote locations. In some implementations, the computer system 110 can implement a fluid model that models the fracturing rheological behavior of Newtonian and non-Newtonian fluids, e.g., fracturing fluids. In some implementations, a model of the complex fracture network and the fluid model can be implemented by respective computer systems that can be connected to each other over one or more wired or wireless networks. The computer system 110 can be implemented on-site or at a location that is remote from the fracture treatment site.

Figure 2:
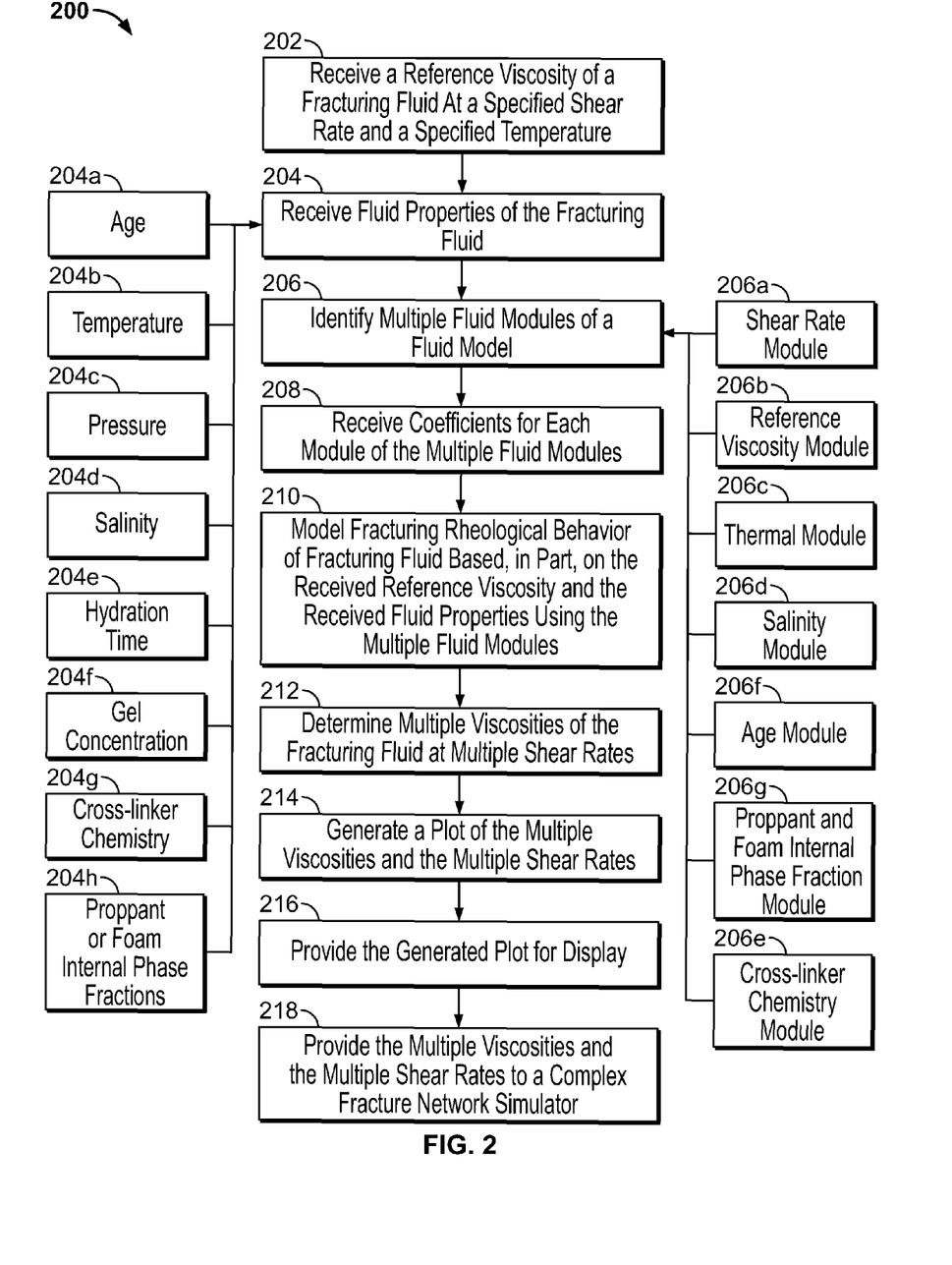
FIG. 2 is a flowchart of an example process to model fracturing rheological behavior of a fracturing fluid.

The computer system 110 can be implemented to include a computer-readable storage medium storing instructions executable by one or more processors to perform operations including modeling a fracturing rheological behavior of a fracturing fluid or a mixture of two or more fracturing fluids (or both). For example, the computer system 110 can be a desktop computer, a laptop computer, a tablet computer, a personal digital assistant, a smartphone, or any other computer system. In some implementations, the computer system 110 can implement the example process 200 shown in FIG. 1 to model the fracturing rheological behavior of the fracturing fluid.

At 202, a reference viscosity of a fracturing fluid is received. For example, the computer system 110 can receive the reference viscosity at a specified shear rate and a specified temperature. The specified shear rate and the specified temperature can be selected such that the reference viscosity at these specified parameters is easily measurable in the field. In certain instances, the specified shear rate can be 511 s$^{-1}$ and the specified temperature can be 25° C. In other instances, the reference viscosity can be at a different specified shear rate and/or temperature.

At 204, fluid properties of the fracturing fluid are received. For example, the computer system 110 can be connected to one or more computer-readable storage devices that stores the fracturing fluid properties including age 204a, temperature 204b, pressure 204c, salinity 204d, hydration time 204e, gel concentration 204f, cross-linker chemistry 204g, proppant or foam internal phase fractions 204h, and other fracturing fluid properties. The computer system 110 may not receive each fracturing fluid property for each instance of modeling. Rather, the computer system 110 can receive those fracturing fluid properties that are relevant to the fracturing fluid being modeled. For example, when the fracturing fluid is water, the computer system 110 may not receive gel concentration 204f or cross-linker chemistry 204g. In another example, the computer system 110 can receive fluid properties based on whether the fracturing fluid is a Newtonian fluid or a non-Newtonian fluid. In some implementations, the computer system 110 can receive additional fluid properties not shown in FIG. 2, e.g., proppant concentration, shear rate, and other fluid properties. In some implementations, the computer system 110 can receive the reference viscosity and the fluid properties as two sets of inputs. The first set can include a fluid name/type, a reference viscosity (or gel concentration or both), and proppant information including proppant concentration. The second set can include the fluid conditions including pressure, temperature, age, shear rate, and other properties shown in FIG. 2.

As described above, the fluid model can model the fracturing rheological behavior of Newtonian and non-Newtonian fluids. The fluid model can include multiple fluid modules, which can be received (e.g., accessed) at 206. For example, the fluid modules can include a shear rate module ($\Gamma$) 206a, a reference viscosity module ($\Psi$) 206b, a thermal module ($\Theta$) 206c, a salinity (ionic strength) module ($\Sigma$) 206d, a cross-linker chemistry module (X) 206e, an age module ($\Lambda$) 206f, and a proppant and foam internal phase fraction module ($\Phi$) 206g. Each module can represent one or more rheological parameters of the fracturing fluid that affect the fracturing rheological behavior of the fracturing fluid. The fluid model can be independent of shear history of the fracturing fluid. In some implementations, each module can be represented by a respective mathematical formula that includes variables that represent the respective rheological parameter. For example, the reference viscosity module ($\Psi$) 206b can be represented by a mathematical formula that includes the specified shear rate and the specified temperature as input variables.

The computer system 110 can be connected to one or more computer-readable storage devices that store the mathematical formulas that represent each module. The one or more computer-readable storage devices can also store one or more coefficients for each module. At 208, the coefficients for each module of the multiple fluid modules can be received. At 210, the fracturing rheological behavior of the fracturing fluid can be modeled based, in part, on the received reference viscosity and the received fluid properties using the multiple fluid modules. In some implementations, the fracturing rheological behavior of the fracturing fluid can be multiple viscosities of the fracturing fluid at respective shear rates and/or multiple temperatures. Thus, the fluid model can be mathematically represented as shown in Equation 1.

$$\mu=[\Gamma][\Psi][\Theta][\Sigma][\Lambda][\Phi][X] \qquad \text{(Equation 1)}$$

The shear rate module ($\Gamma$) 206a can be represented by Equations 2 and 3 shown below. The apparent viscosity for a Carreau model is given by Equation 2.

$$\mu = \mu_\infty + (\mu_0 - \mu_\infty)\left[1 + \left(\frac{\gamma}{\gamma_L}\right)^2\right]^{(n_p-1)/2} \qquad \text{(Equation 2)}$$

In Equation 2, $\mu_0$ and $\mu$ are the low-shear and infinite shear viscosity, $n_p$ is power law index, $\gamma$ is shear rate, and $\gamma_L$ is the transition shear rate. In the fields, apparent viscosity is measured typically at 511 s$^{-1}$ from which transition shear rate can be obtained as shown in Equation 3.

$$\gamma_L = 511\left[\left(\frac{\mu_{511} - \mu_\infty}{\mu_0 - \mu_\infty}\right)^{\frac{2}{n_p-1}} - 1\right]^{-1/2} \qquad \text{(Equation 3)}$$

The stimulation fluids are categorized into 1. Waters, 2. Acids, 3. base gels, 4. cross-linked gels, and 5. other treatment fluids. The primary component of these fluids is either water or oil. Therefore, the high shear viscosity is approximated as the viscosity of water or diesel at given temperature and pressure. Consequently, the correlations are needed only for $\mu_0$, $n_p$, and $\mu_{511}$. The apparent viscosity and hence the Carreau parameters depend on polymer concentration, operating conditions (temperature, pressure), the presence of crosslinkers, age (defined later) and additives (salts, etc.). These effects and the developed models are illustrated in the following subsections. We make use of ML fitting functions [see table 1] for modeling various types of behavior.

The reference viscosity module ($\Psi$) 206b can be represented by Equations 4A, 4B, 5A and 5B shown below.

$$\psi(t) = \mu_{cr} + f_{cr}(\psi_{bg} - \psi_{cr}) \qquad \text{(Equation 4A)}$$

$$f_{cr} = \left[1 + \left(\frac{t}{t_{cr}}\right)^{e_{cr}}\right]^{-\alpha} \qquad \text{(Equation 4B)}$$

$$\psi(t) = \mu_\infty + f_{br}(\psi_{cr} - \psi_\infty) \qquad \text{(Equation 5A)}$$

$$f_{br} = \left[1 + \left(\frac{6t}{t_{br}e_{br}}\right)^{e_{br}}\right]^{-\beta} \qquad \text{(Equation 5B)}$$

In Equations 4A, 4B, 5A and 5B, $t_{br}$ and $t_{cr}$ are the crosslink and break times and $e_{br}$ and $e_{cr}$ are the exponents. The exponents ($\alpha, \beta$) and infinity values used for Carreau parameters are different and are shown in the table below.

Crosslink and Break Parameters in Eq. 8 and 9

| $\psi$ | $\psi_\infty$ | $\alpha$ | $\beta$ |
|---|---|---|---|
| $\mu_0$ | $\mu_\infty$ | −3 | −3.0 |
| $\mu_{S11}$ | $\mu_\infty$ | −4 | −1.0 |
| $n_p$ | 1.0 | −35 | −0.5 |

The crosslink carreau parameters are functions of temperature and base gel viscosity. In addition, the reaction kinetics depends on the underlying polymer structure. Therefore, temperature and polymer loading effects are unique for each crosslinker and hence the fluid.

The thermal module (Θ) 206c and the salinity (ionic strength) module (Σ) 206d are defined by hydration kinetics. The proppant and foam internal phase fraction module (Φ) 206g is represented by Equations below. Effective internal phase fraction due to particles and foam is represented by Equation below. In fracturing operation, to facilitate the proppant transport and to minimize the fluid loss to formations, a high viscosity fluid can be used. One way to increase the viscosity of the water-based fluids is to add a polymer that will bind with water molecules. Such polymer solutions are sometimes known as linear or base gels. Examples of such gels include WG-35™, WG-18™, BP-10™, which differ in the type of polymer (guar, HPC, xanthan, cellulose etc.) used to bind with water. The polymer undergoes hydration process and forms a viscous network causing an increase in the viscosity of the fluid in time. The ratio of viscosity of partially hydrated gel and fully hydrated gel over time with varying temperature shows that the viscosity starts with water viscosity at the reference temperature and reaches its fully hydrated value after approximately 1 hr. This behavior can be modeled using the empirical correlation shown in Equation 6.

$$\frac{\mu(t)}{\mu(t=3600)} = \text{fit\_cr}(t, 0, v_w/\mu(3600), y_l, a, b, 3600, 1) \quad \text{(Equation 6)}$$

In Equation 6, fit_cr is a fitting function represented by Equation 7.

$$y = y_r + \frac{(y_l - y_r)}{\left[1 + \left(\frac{x - x_l}{x_r - x_l}\right)^a\right]^b} \quad \text{(Equation 7)}$$

In Equation 7, $x_l$, $x_r$, and $x_t$ are temperature values, $y_l$, $y_r$ and $y_t$ are viscosity values, and parameter b is kept constant and specific to the underlying polymer. The parameters of correlation are determined by executing computer instructions that use a built-in non-linear fit function. The parameter, a, obtained for each temperature is then plotted versus temperature. Physically, at high temperatures, the transport of polymer molecules is enhanced that leads to speed up of the hydration process. Therefore, the parameter a signifies the inverse of diffusion coefficient of the polymer chains in water. The behavior of a with temperature can be modeled using the correlation shown in Equation 8.

$$a(T) = \text{fit\_pl}(T, 278.15, y_l, 338.15, y_r) \quad \text{(Equation 8)}$$

In Equation 8, T is the temperature. Experiments to determine the effect of salt concentration on hydration rate for WG-37™ reveals that the added salt molecules hinder the transport of polymer chains leading to decrease in the rate of hydration. The effect is captured by proposing a correction to parameter a as shown in Equation 9.

$$a = \frac{a_1(T)}{a_2(Is)} \quad \text{(Equation 9)}$$

The parameter $a_2$ is a function of salt molarity. The effect saturates after a weight fraction of 20%. The term, $a_2(Is)$ can be predicted using the correlation shown in Equation 10.

$$a_2(I_s) = \text{fit\_pl}(I_s, x_l, 1.0, c, x_r, y_r) \quad \text{(Equation 10)}$$

In some implementations, the model parameters of hydration kinetics can be determined by implementing the following techniques. Plot apparent viscosity, $\mu_{511}$, versus hydration time for different temperatures for zero salt concentration. Select parameter b=constant (range 1-25) by trial and error procedure (or solver) and find $a(T) = a_1(T)$. Plot $a_1(T)$ versus temperature and use equations above to obtain model parameters for $a_1(T)$. Plot apparent viscosity, $\mu_{511}$, versus hydration time for different salt concentrations at 298K. Keeping the same parameter b, find a. Find $a_2(Is)$ from the relation shown in Equation 11.

$$a = a_1(T=298\text{ K})/a_2(Is) \quad \text{(Equation 11)}$$

The proppant and foam internal phase fraction module (Φ) 206g is represented by Equation 12.

$$q = \frac{\phi_{N2}}{0.95} + \frac{\phi_{CO2}}{0.95} + \frac{\phi_{prop}}{0.65} \quad \text{(Equation 12)}$$

Correction for foam collapse is represented by Equation 13.

$$f = 0.75 - \frac{1.0}{51.44q^4}; q > 0.6 \quad \text{(Equation 13)}$$

Relative change in viscosity of the base fluid is represented by Equation 14.

$$\mu_r = (1-f)^{-1.8} \quad \text{(Equation 14)}$$

Crosslink fluids are represented by Equations 15 and 16.

$$f_{xl} = 1 + \frac{\left(\frac{\mu_0^{xl}}{\mu_0^{bg}} - 1\right)}{1 + f} \quad \text{(Equation 15)}$$

$$D = \frac{f_{xl}}{[(f_{xl} - 1)(1 + f) + 1]} \quad \text{(Equation 16)}$$

Carreau parameters are modified as shown in Equation 17.

$$\mu_{0 fac} = D\mu_r; \mu_{511 fac} = D\mu_r^n; n_{fac} = 1 \quad \text{(Equation 17)}$$

The cross-linker chemistry module (X) 206e is represented by Equation 18.

$$\mu_{cr} = \text{fit\_ct}(T, T_l, \mu_l, a, b, T_r, \mu_r, c, d, T_l, \mu_w) \quad \text{(Equation 18)}$$

In Equation 18, $\mu_w$ is the viscosity of water at reference T and P. The parameters a, b, c, d are constants and are specific to each fluid. The other parameters of the correlation are functions of base gel viscosity. The approximations made for base gel viscosity dependence are kept uniform for all fracturing fluids. The functionalities are summarized in the table below.

Functional approximations for parameters of crosslink $\mu_o$ and $\mu_{511}$

| | |
|---|---|
| $T_l$ | $A_1\mu_{bg} + A_2$ |
| $T_t$ | $B_1\mu_{bg} + B_2$ |
| $T_r$ | $C_1\mu_{bg} + C_2$ |
| $\mu_l$ | fit_pt($\mu_{bg}$, $x_l$, $y_l$, a, $x_t$, $y_t$, b, $x_r$, $y_r$) |
| $\mu_t$ | fit_pt($\mu_{bg}$, $x_l$, $y_l$, a, $x_t$, $y_t$, b, $x_r$, $y_r$) |

For cross-link power-law index, Equation 19 is used.

$$n_{cr} = \text{fit\_pt}(\mu_{bg}, x_l, y_l, a, x_t, y_t, b, x_r, y_r) \quad \text{(Equation 19)}$$

The parameters b and $y_l$ in Equation 19 are constant (for a material). The rest are functions of temperature as shown in the table below.

Functional approximations for parameters of crosslink $n_p$.

| | |
|---|---|
| a | $a = a_1T + b_1$ |
| xl | $x_l = a_2T + b_2$ |
| xt | $x_t = a_3T + b_3$ |
| xr | $x_r = a_3T + b_3$ |
| yt | $yt = a_4T^2 + b_4T + C_4$ |
| yr | $yr = a_5T^2 + b_5T + C_5$ |

In some implementations, the computer system 110 can model the fracturing rheological behavior of the fracturing fluid using the multiple fluid modules shown in Equation 1. To do so, for example, the computer system 110 can receive the coefficient for each module, input the received fracturing fluid properties into the appropriate mathematical formulas, and solve for an output viscosity at a specified shear rate or at a specified temperature (or both a shear rate and a temperature). In this manner, multiple viscosities at multiple shear rates and/or multiple temperatures can be determined at 212.

After modeling the fracturing rheological behavior of the fracturing fluid to determine multiple viscosities of the fracturing fluid at respective multiple shear rates and/or the multiple temperatures, the computer system 110 can provide the fracturing rheological behavior of the fracturing fluid. To do so, a plot of the multiple viscosities and the multiple shear rates and/or the multiple temperatures can be generated, at 214, and provided for display, at 216. Alternatively, or in addition, at 218, the multiple viscosities and the multiple shear rates and/or the multiple temperatures can be provided as input to a fracture network simulator that can implement a complex fracture network simulation. In some implementations, the computer system 110 can provide the multiple viscosities and the multiple shear rates to one or more computer systems or computer-readable storage devices (or both) over one or more wired or wireless networks, e.g., local area networks, wide area networks, the Internet, or other similar networks. In some implementations, the computer system 110 can provide the multiple viscosities and the multiple shear rates to a printing device that print one or more plots of the viscosities versus shear rates.

Figure 4A:
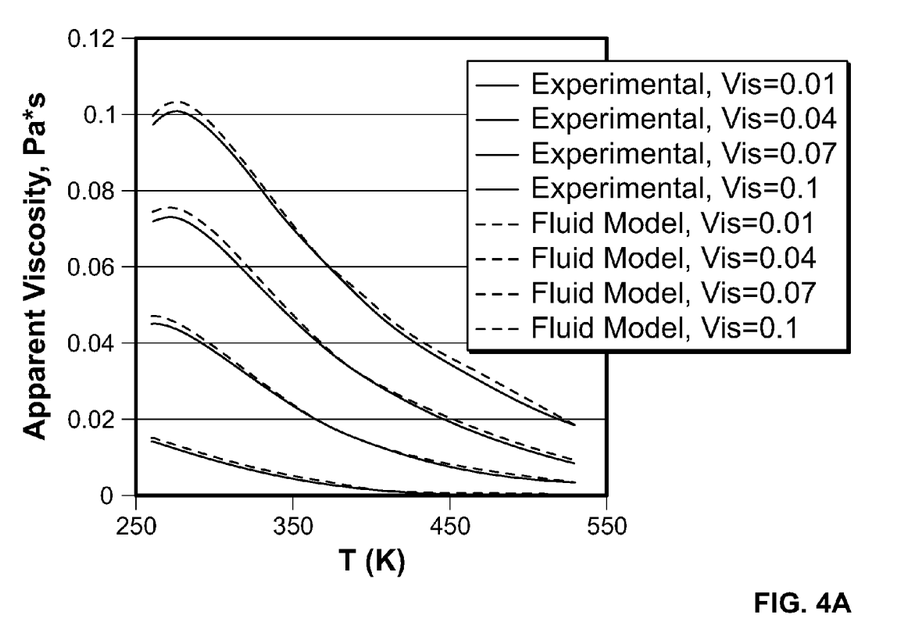
FIGS. 4A-4D are example plots validating the fluid model that models the fracturing rheological behavior of a fracturing fluid.
Figure 4B:
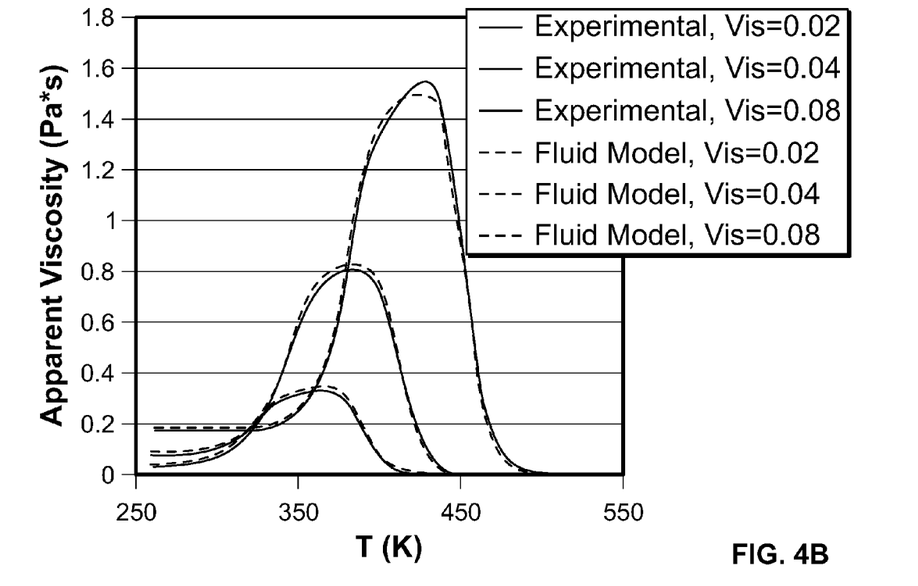
Figure 4C:
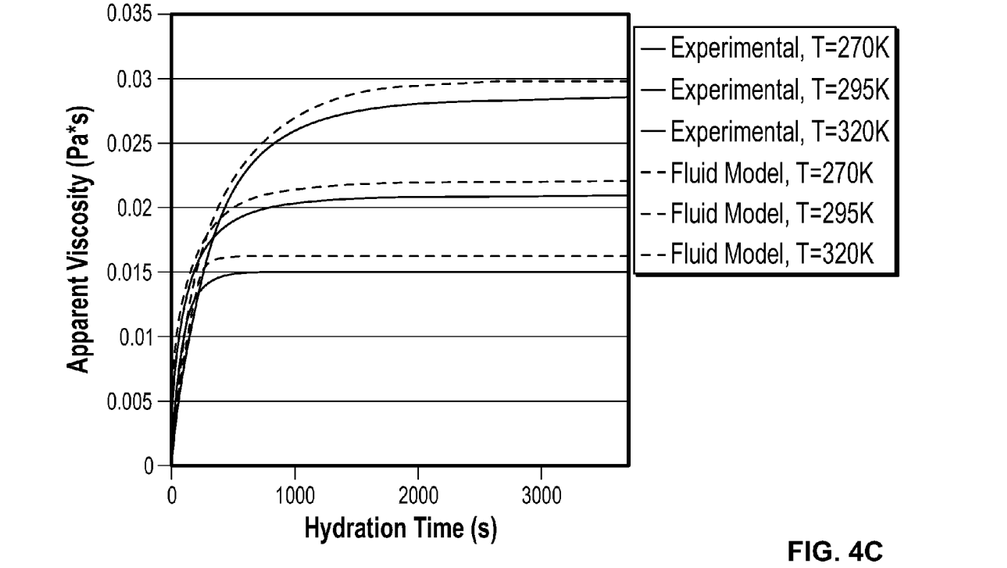
Figure 4D:
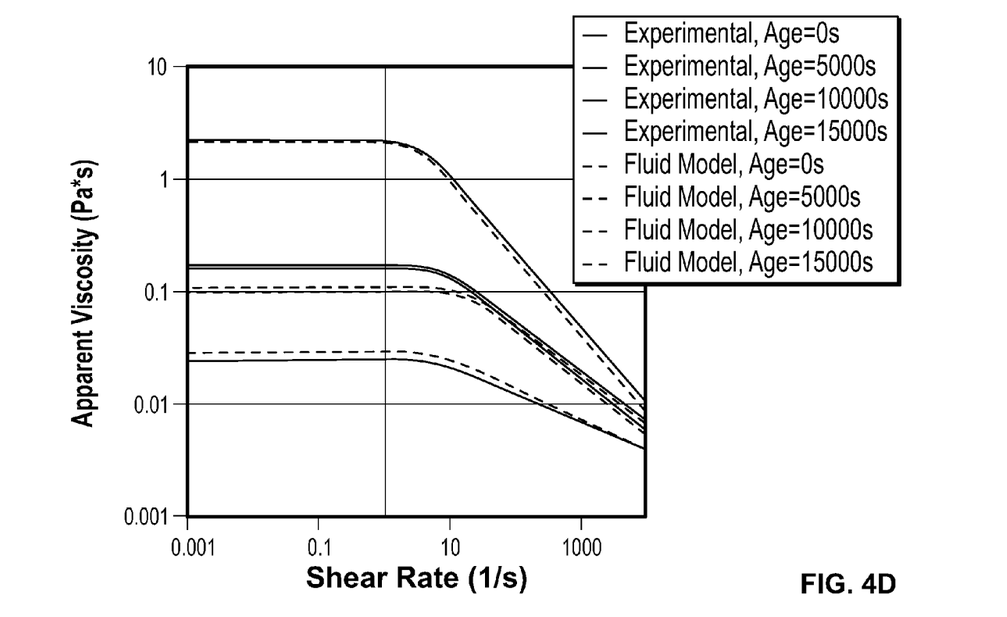

The fluid model used to model the fracturing rheological behavior of a fracturing fluid has been validated in the plots shown in FIGS. 4A-4D. FIG. 4A shows a plot of apparent viscosity of WG-35™ (base gel) over a range of temperatures for different reference gel viscosities. FIG. 4B shows a plot of apparent viscosity of pHaser Frac™ (a cross-linked gel) at an age of 10 minutes over a range of temperatures for different viscosities. FIG. 4C shows a plot of apparent viscosity of WG-35™ (base gel) over a range of hydration times for different temperatures. FIG. 4D shows a plot of apparent viscosity of Delta Frac 140-R™ (a cross-linked gel) with a reference viscosity of 0.02 Pa*s over a range of shear rates for different ages. Each plot shows that the apparent viscosities determined using the fluid model substantially matched experimentally determined apparent viscosities. The experimentally determined apparent viscosities can be obtained from previously developed, established, experimentally-based and verified phenomenological models.

In some implementations, the techniques described above to model the fracturing rheological behavior of a fracturing fluid can be repeated for different fracturing fluids used or to be used during different fracturing phases. For example, in a first phase of fracturing and a subsequent second phase of fracturing, a first fracturing fluid and a second fracturing fluid can be used, respectively. The computer system 110 can initially receive an input identifying the first fracturing fluid. In response, the computer system 110 can model the fracturing rheological behavior of the first fracturing fluid by implementing the techniques described above. Subsequently, the computer system 110 can receive an input identifying the second phase fracturing fluid. In response, the computer system 110 can model the fracturing rheological behavior of the second phase fracturing fluid based, in part, on a reference viscosity and fluid properties of the second phase fracturing fluid. The first phase and second phase of fracturing can represent separate stages (e.g., successive stages) of fracturing or can represent sub-stages during the same stage of fracturing.

In some implementations, the fracturing fluid can be a mixture of a first fracturing fluid and a second fracturing fluid. As described with reference to process 300 shown in FIG. 3, the computer system 110 can implement a mixing rheological model to determine a rheological property of the mixture, e.g., a viscosity or multiple viscosities at respective multiple shear rates. The rheological property can also include a zero shear viscosity (i.e., low shear viscosity plateau), an infinite shear viscosity (i.e., a high shear viscosity plateau), flow behavior index and apparent viscosity. In some implementations, a friction model associated with the mixed rheological model can predict friction. At 302, it can be determined that a fracturing fluid is a mixture of a first fracturing fluid and a second fracturing fluid. For example, the computer system 110 can receive an input (e.g., from a user or from another computer system) that the fracturing fluid is a mixture. At 304 and at 306, the fluid properties of the first fracturing fluid and the second fracturing fluid, respectively, can be received. For example, the computer system 110 can receive fluid properties similar to those described above.

Figure 3:
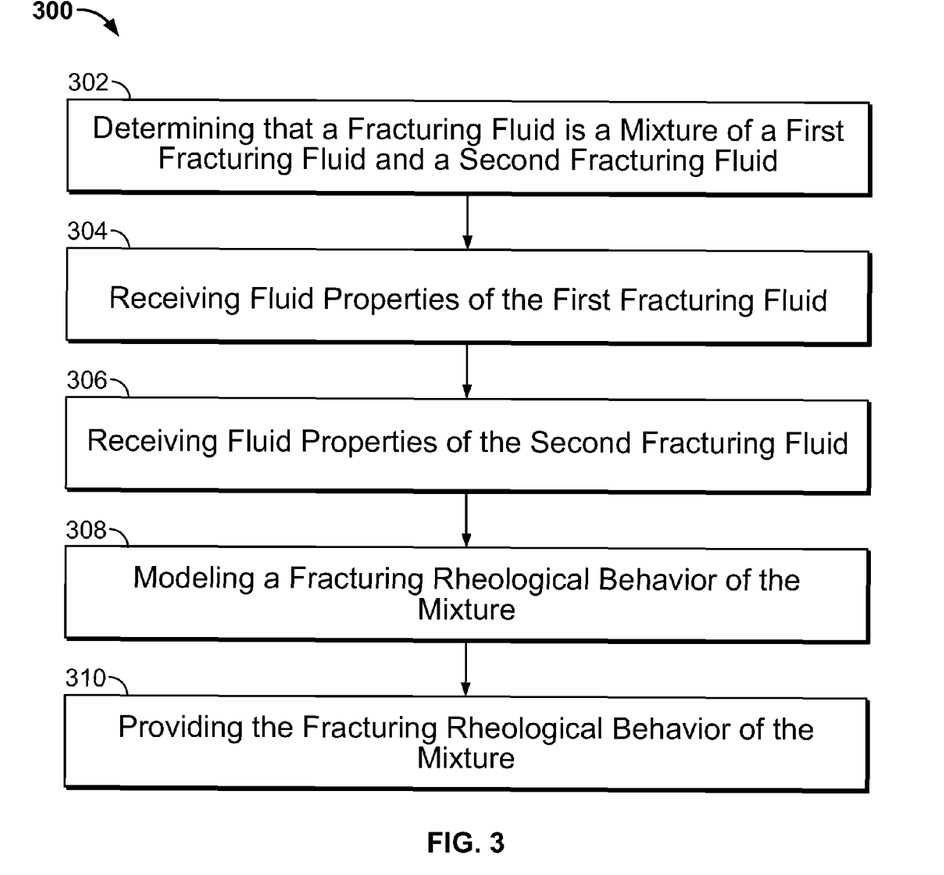
FIG. 3 is a flowchart of an example process to model fracturing rheological behavior of a mixture of two or more fracturing fluids.

In some implementations, the computer system 110 can implement the mixing rheological model to determine a rheological behavior, e.g., a viscosity, of the mixture. For a gel-based fracturing fluid, for example, the computer system 110 can implement the mixing rheological model to predict the rheology of the mixture based on a dilution of base gels and by recovering the apparent viscosity from a final polymer concentration. For example, when WG-35 with reference viscosity of 0.02 Pa*s is mixed with water, the gel concentration in the mixture can be obtained and the mixture viscosity recalculated based on viscosity-gel relations (quadratic). The mixing rheological model can be formulated based on mixing the Carreau parameters ($\mu_0$, $\mu_{511}$, $n_p$) and the mass fraction ($c_i$) of individual fluids in the mixture, as shown in Equations 20-24.

$$\mu_{mix} = \mu_{\infty,mix} + (\mu_{0,mix} - \mu_{\infty,mix})\left[1 + \left(\frac{\gamma}{\gamma_{L,mix}}\right)^2\right]^{(n_{mix}-1)/2} \quad \text{(Equation 20)}$$

$$\mu_{0,mix}^{\alpha} = \sum_i c_i \mu_{0,i}^{\alpha} \quad \text{(Equation 21)}$$

$$\mu_{511,mix}^{\alpha} = \sum_i c_i \mu_{511,i}^{\alpha} \quad \text{(Equation 22)}$$

$$n_{mix}^{\alpha} = \sum_i c_i n_i^{\alpha} \quad \text{(Equation 23)}$$

$$\mu_{\infty,mix}^{\alpha} = \sum_i c_i \mu_{\infty,i}^{\alpha} \quad \text{(Equation 24)}$$

The Carreau parameters ($\mu_{0,i}$, $\mu_{511,i}$, $\mu_{\infty,i}$, $n_i$) for individual fluids in the mixture can be obtained from the fracturing rheological model described above. Power law, a, is different for each Carreau parameter and also changes with fluid. The Carreau parameters shown in Equations 25-27 were determined after testing with dilution of base gels, e.g., guar and bio-polymer based gels).

$$\mu_{0,mix}^{0.5} = \sum_i c_i \mu_{511,i}^{0.5} \quad \text{(Equation 25)}$$

$$\mu_{0,mix}^{\alpha} = \sum_i c_i \mu_{0,i}^{\alpha}; \alpha = 0.28\frac{S}{S_0}; S = \log_{10}\frac{\mu_{0,max}}{\mu_{0,min}} \quad \text{(Equation 26)}$$

$$n_{p,mix}^{\alpha} = \sum_i c_i n_{p,i}^{\alpha}; \alpha = 0.5\frac{S}{N_0} \quad \text{(Equation 27)}$$

The power law of mixing rule, $\alpha$, is found to be function of polymer strength, S. The polymer strength can be measured by taking the ratio of maximum and minimum low shear viscosities fluids in the mixture. Remaining parameters are determined as $S_0=6$, $N_0=2$.

Figure 5A:
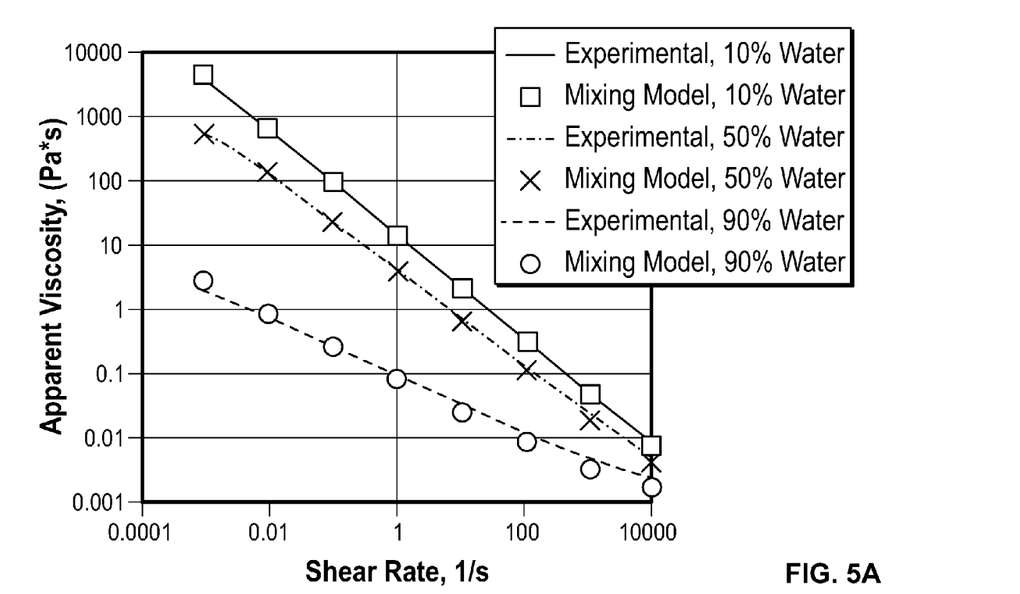
FIGS. 5A-5F are example plots validating the mixing rheological model that models the rheological behavior of a mixture of two or more fracturing fluids.
Figure 5B:
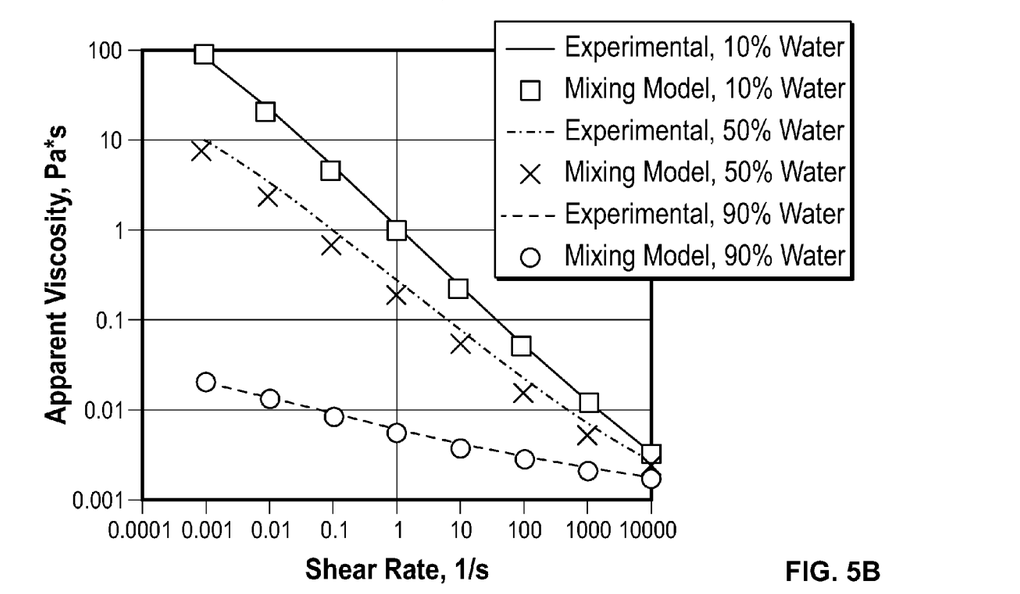
Figure 5C:
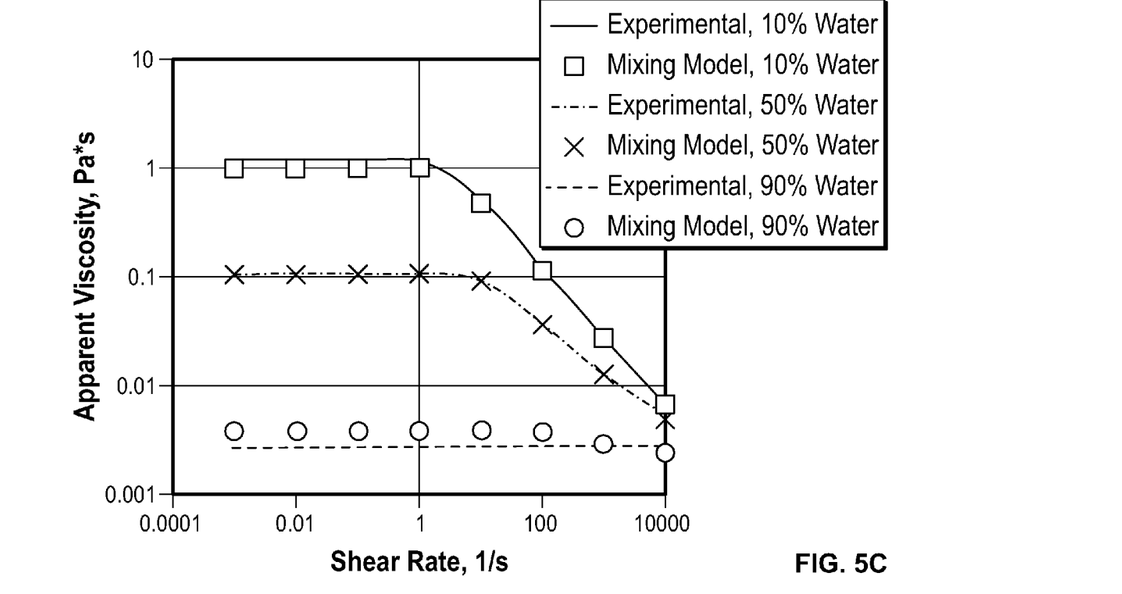
Figure 5D:
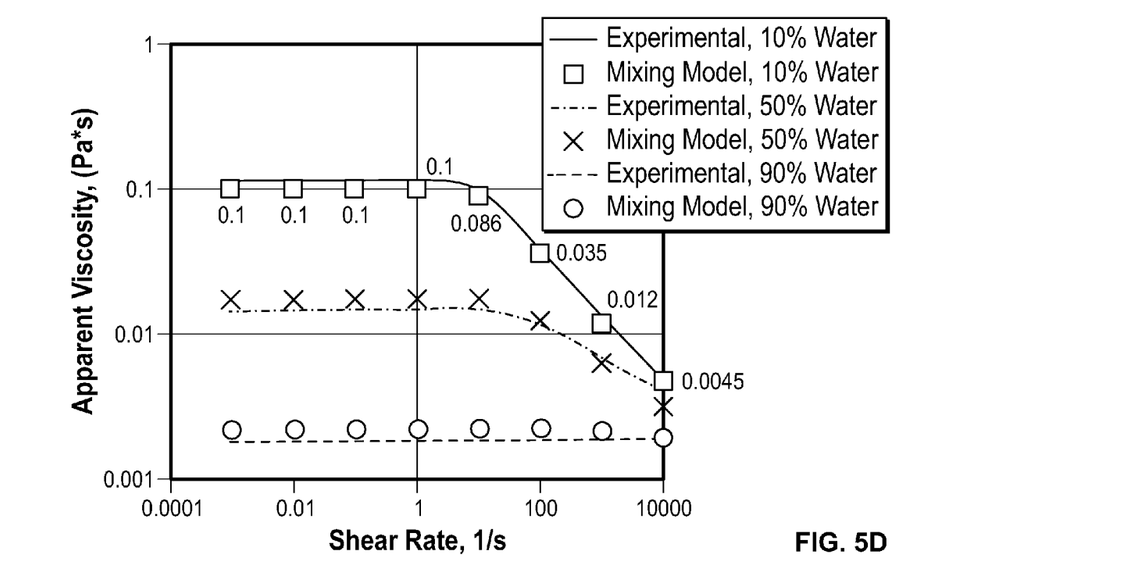
Figure 5E:
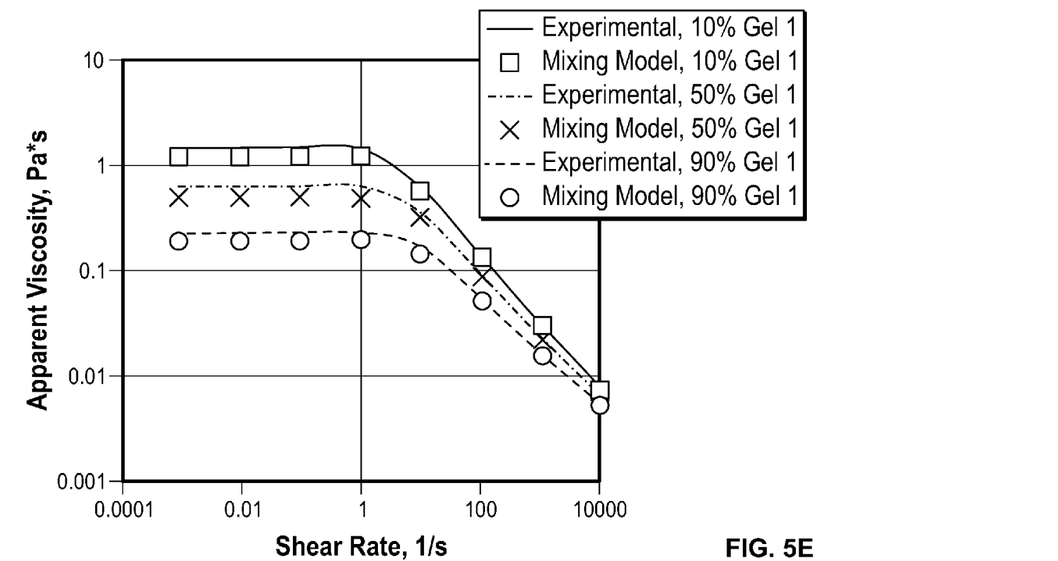
Figure 5F:
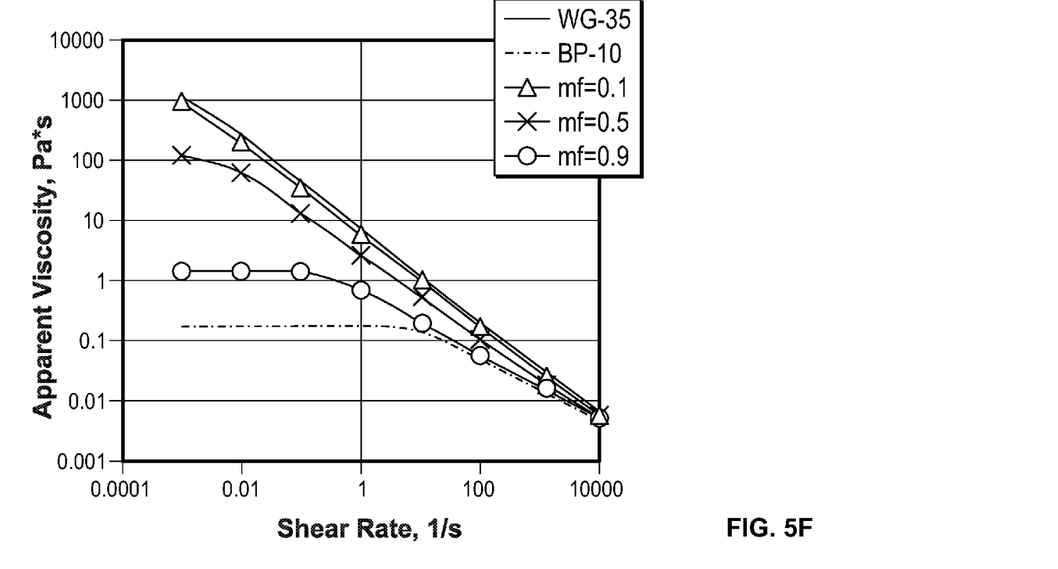

The mixing rheological model used to model the rheological behavior of the mixture has been validated in the plots shown in FIGS. 5A-5F. FIG. 5A shows a plot of apparent viscosity over a range of shear rates for a mixture of BP-10™ and water with a reference viscosity of 0.1 Pa*s. FIG. 5B shows a plot of apparent viscosity over a range of shear rates for a mixture of BP-10 and water with a reference viscosity of 0.02 Pa*s. FIG. 5C shows a plot of apparent viscosity over a range of shear rates for a mixture of linear gel and water with a reference viscosity of 0.05 Pa*s. FIG. 5D shows a plot of apparent viscosity over a range of shear rates for a mixture of linear gel and water with a reference viscosity of 0.02 Pa*s. FIG. 5E shows a plot of apparent viscosity over a range of shear rates for a mixture of WG-35 with a reference viscosity of 0.02 PA*s and WG-35 with a reference viscosity of 0.05 Pa*s. FIG. 5F shows a plot of apparent viscosity over a range of shear rates for a mixture of WG-35 with a reference viscosity of 0.02 Pa*s and BP-10 with a reference viscosity of 0.05 Pa*s. Each plot shows that the apparent viscosities determined using the mixing rheological model described here substantially matched experimentally determined apparent viscosities. In addition, FIG. 5F shows mass fractions for WG-35™. In particular, no synergistic effects are observed using the mixing rheological model. In other words, the viscosity of the mixture is not greater than the viscosity of any fracturing fluid included in the mixture when gels of different strength are mixed.

Returning to FIG. 3, at 308, a fracturing rheological behavior of the mixture can be modeled. Based on the modeled viscosity and based on the fluid properties of the first fracturing fluid and those of the second fracturing fluid, the computer system 110 can model a fracturing rheological behavior of the mixture by implementing techniques similar to those described above. At 310, the fracturing rheological behavior of the mixture can be provided. For example, the computer system 110 can display the rheological behavior of the mixture and the fracturing rheological behavior of the mixture in a display device, e.g., as plots of viscosity v/s shear rate or other variable. Alternatively, or in addition, the computer system 110 can generate the plots describing the rheological behavior and the fracturing rheological behavior, and provide the plots to a printing device. In some implementations, the computer system 110 can provide the plots as an input to another computer software application, e.g., a fracture network simulator.

Figure 6:
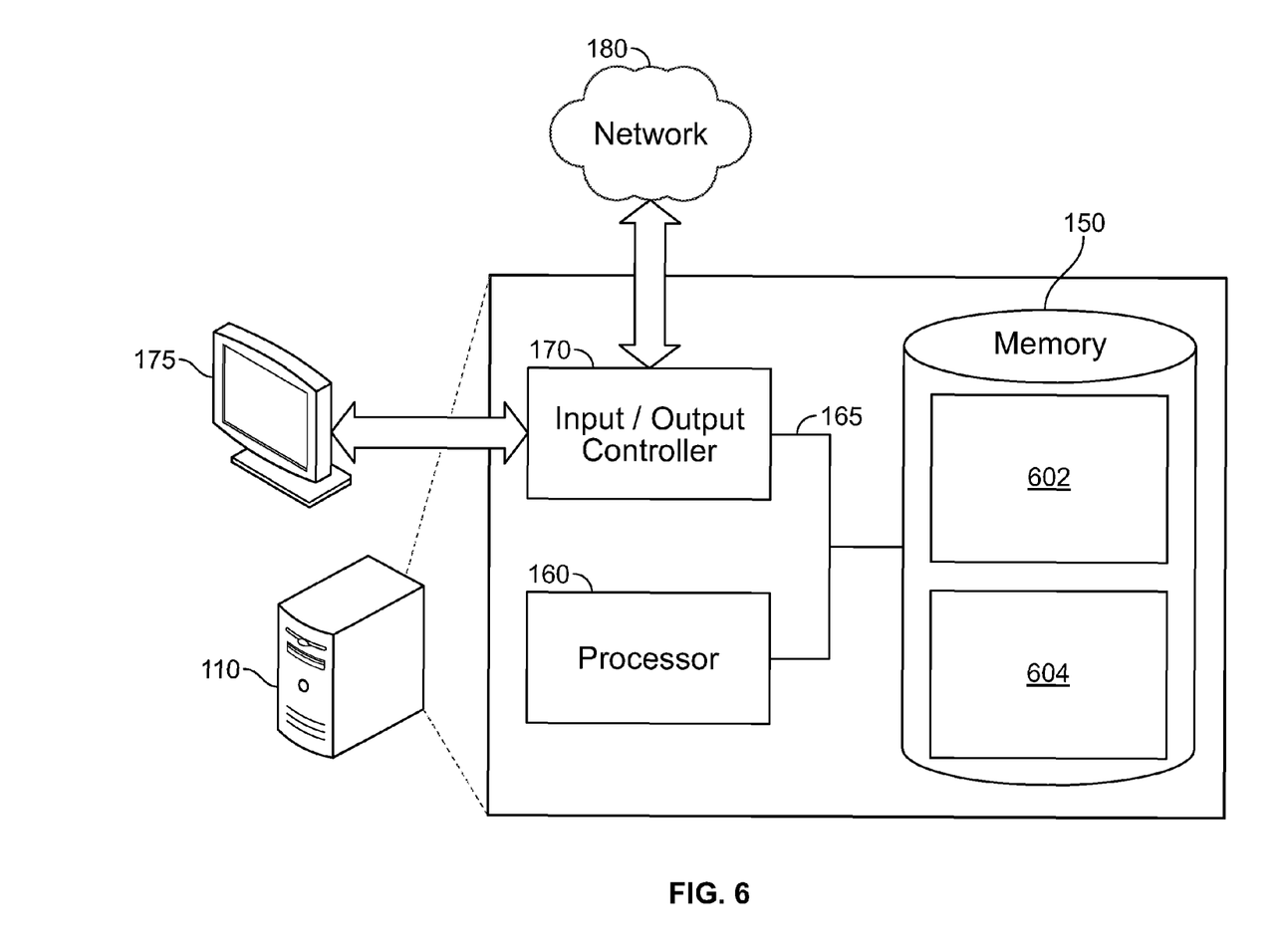
FIG. 6 illustrates a schematic of the example computer system of FIG. 1.

FIG. 6 illustrates a schematic of the example computer system 110 of FIG. 1. The example computer system 110 can be located at or near one or more wells of the well system 100 and/or at a remote location. The example computer system 110 includes a processor 160, a memory 150, and input/output controllers 170 communicably coupled by a bus 165. The memory can include, for example, a random access memory (RAM), a storage device (e.g., a writable read-only memory (ROM) and/or others), a hard disk, and/or another type of storage medium. The computer system 110 can be preprogrammed and/or it can be programmed (and reprogrammed) by loading a program from another source (e.g., from a CD-ROM, from another computer device through a data network, and/or in another manner). The input/output controller 170 is coupled to input/output devices (e.g., a monitor 175, a mouse, a keyboard, and/or other input/output devices) and to a network 180. The input/output devices receive and transmit data in analog or digital form over communication links such as a serial link, wireless link (e.g., infrared, radio frequency, and/or others), parallel link, and/or another type of link.

The network 180 can include any type of data communication network. For example, the network 180 can include a wireless and/or a wired network, a Local Area Network (LAN), a Wide Area Network (WAN), a private network, a public network (such as the Internet), a WiFi network, a network that includes a satellite link, and/or another type of data communication network. The network 180 can include some or all of the communication link 118 of FIG. 1.

The memory 150 can store instructions (e.g., computer code) associated with an operating system, computer applications, and/or other resources. The memory 150 can also store application data and data objects that can be interpreted by one or more applications and/or virtual machines running on the computer system 110. As shown in FIG. 6, the example memory 150 includes the fluid model, the mixing rheological model, or a model of the complex fracture network 602 (or combinations of them), each implemented as computer-readable instructions executable by the processor 160. In some implementations, a memory of a computing device may include some or all of the information stored in the memory 150. In some implementations, the models can be stored on a computer-accessible repository (not shown) that is separate from the memory 150. The computer system 110 can be configured to obtain either the model of the complex fracture network, the fluid model, or the mixing rheological model (or combinations of them) from the repository over the network 180.

The processor 160 can execute instructions, for example, to generate output data based on data inputs. For example, the processor 160 can execute the fluid model or the mixing rheological model (or both) by executing and/or interpreting the software, scripts, programs, functions, executables, and/or other modules as which either or both models are implemented. The processor 160 may perform one or more of the operations described above. The input data received by the processor 160 and/or the output data generated by the processor 160 may include input from a user or input from one or both models.

A number of implementations have been described. Nevertheless, it will be understood that various modifications may be made without departing from the spirit and scope of the disclosure.

The invention claimed is:

1. A computer-implemented method comprising:
receiving a reference viscosity and fluid properties of a fracturing fluid, wherein the fracturing fluid is a mixture of a first fracturing fluid and a second fracturing fluid, and receiving the fluid properties of the fracturing fluid comprises receiving first fluid properties of the first fracturing fluid and second fluid properties of the second fracturing fluid;
modeling a viscosity of the mixture based, in part, on a mixing rheological model that models a rheological behavior of a mixture of at least two fluids and based, in part, on the first fluid properties and the second fluid properties;
modeling a fracturing rheological behavior of the fracturing fluid using a fluid model that models the fracturing rheological behavior of Newtonian and non-Newtonian fluids based, in part, on the received reference viscosity and the received fluid properties of the fracturing fluid;
providing the fracturing rheological behavior of the fracturing fluid; and
performing a hydraulic fracturing operation in a subterranean hydrocarbon reservoir using a fracturing fluid having the provided fracturing rheological behavior.

2. The method of claim 1, wherein modeling the fracturing rheological behavior of the fracturing fluid comprises determining a plurality of viscosities of the fracturing fluid at a respective plurality of shear rates.

3. The method of claim 1, wherein receiving the fluid properties of the fracturing fluid comprises receiving one or more of age, temperature, pressure, salinity, hydration time, gel concentration, cross-linker chemistry, proppant, or foam internal phase fractions.

4. The method of claim 1, wherein the fluid model comprises a plurality of fluid modules, wherein modeling the fracturing rheological behavior of the fracturing fluid using the fluid model comprises modeling the fracturing rheological behavior of the fracturing fluid using the plurality of fluid modules.

5. The method of claim 4, wherein modeling the fracturing rheological behavior of the fracturing fluid using the plurality of fluid modules comprises receiving a coefficient for each module of the plurality of modules.

6. The method of claim 4, wherein the plurality of fluid modules comprises a shear rate module, a reference viscosity module, a thermal module, a salinity module, a cross-linker chemistry module, an age module, and a proppant and foam internal phase fraction module.

7. The method of claim 1, wherein providing the fracturing rheological behavior of the fracturing fluid comprises:
generating a plot of the fracturing rheological behavior; and
providing the plot for display.

8. The method of claim 7, wherein generating the plot of the fracturing rheological behavior comprises generating a plot of viscosity versus shear rate.

9. The method of claim 1, wherein providing the fracturing rheological behavior of the fracturing fluid comprises providing the fracturing rheological behavior as an input to a complex fracture network simulation application.

10. The method of claim 1, further comprising determining the reference viscosity of the fracturing fluid at a specified shear rate and a specified temperature.

11. The method of claim 10, wherein the specified shear rate is 511 s$^{-1}$ and the specified temperature is 25° C.

12. The method of claim 1, wherein the fracturing fluid is a first phase fracturing fluid used in a first phase of fracturing, and wherein the method further comprises:
identifying a second phase fracturing fluid used in a second phase that follows the first phase; and
modeling the fracturing rheological behavior of the second phase fracturing fluid based on the reference viscosity and fluid properties of the second phase fracturing fluid.

13. A system comprising:
a computer system comprising:
one or more processors; and
a computer-readable medium storing instructions executable by the one or more processors to perform operations comprising:
receiving a reference viscosity and fluid properties of a fracturing fluid comprising receiving one or more of age, temperature, pressure, salinity, hydration time, gel concentration, cross-linker chemistry, proppant, or foam internal phase fractions, wherein the fracturing fluid is a mixture of a first fracturing fluid and a second fracturing fluid, and receiving the fluid properties of the fracturing fluid comprises receiving first fluid properties of the first fracturing fluid and second fluid properties of the second fracturing fluid;
modeling a viscosity of the mixture based, in part, on a mixing rheological model that models a rheological behavior of a mixture of at least two fluids and based, in part, on the first fluid properties and the second fluid properties;
modeling a fracturing rheological behavior of the fracturing fluid using a shear history-independent fluid model that models the fracturing rheological behavior of Newtonian and non-Newtonian fluids based, in part, on the received reference viscosity and the received fluid properties of the fracturing fluid;
providing the fracturing rheological behavior of the fracturing fluid; and
a hydraulic fracturing system configured to perform a hydraulic fracturing operation in a subterranean hydrocarbon reservoir using a fracturing fluid having the fracturing rheological behavior provided by the computer system.

14. The system of claim 13, wherein the fluid model comprises a plurality of fluid modules comprising a shear rate module, a reference viscosity module, a thermal module, a salinity module, an age module, and a proppant and foam internal phase fraction module, and wherein modeling the fracturing rheological behavior of the fracturing fluid using the fluid model comprises receiving a coefficient for each module of the plurality of modules, and wherein the operations further comprise determining the reference viscosity of the fracturing fluid at a specified shear rate of 511 $s^{-1}$ and a specified temperature of 25° C.

* * * * *

UNITED STATES PATENT AND TRADEMARK OFFICE
CERTIFICATE OF CORRECTION

PATENT NO. : 9,719,338 B2
APPLICATION NO. : 14/019347
DATED : August 1, 2017
INVENTOR(S) : Pandurang Manohar Kulkarni, Andrey Filippov and Harold Grayson Walters It is certified that error appears in the above-identified patent and that said Letters Patent is hereby corrected as shown below:

In the Specification

In Column 5, Line 8 approximately, delete "$\mu_{S11}$" and insert --$\mu_{511}$--

In Column 9, Line 9 approximately, delete Equation 21:

" $\mu_{0,mix}^{\alpha} = \sum_{i} c_i \mu_{0,i}^{\alpha}$ " and insert -- $\mu_{0,mix}^{\alpha} = \sum_{i} c_i \mu_{0,i}^{\alpha}$ --

In Column 9, Line 11 approximately, delete equation 22:

" $\mu_{511,mix}^{\alpha} = \sum_{i} c_i \mu_{511,i}^{\alpha}$ " and insert -- $\mu_{511,mix}^{\alpha} = \sum_{i} c_i \mu_{511,i}^{\alpha}$ --

In Column 9, Line 14 approximately, delete Equation 23:

" $n_{mix}^{\alpha} = \sum_{i} c_i n_i^{\alpha}$ " and insert -- $n_{mix}^{\alpha} = \sum_{i} c_i n_i^{\alpha}$ --

In Column 9, Line 16 approximately, delete Equation 24:

" $\mu_{\infty,mix}^{\alpha} = \sum_{t} c_i \mu_{\infty,i}^{\alpha}$ " and insert -- $\mu_{\infty,mix}^{\alpha} = \sum_{t} c_i \mu_{\infty,i}^{\alpha}$ --

In Column 9, Line 29 approximately, delete Equation 25:

" $\mu_{0,mix}^{0.5} = \sum_{i} c_i \mu_{511,i}^{0.5}$ " and insert -- $\mu_{0,mix}^{0.5} = \sum_{t} c_i \mu_{511,i}^{0.5}$ --

Signed and Sealed this
Tenth Day of July, 2018

Andrei Iancu
*Director of the United States Patent and Trademark Office*

In Column 9, Line 32 approximately, delete Equation 26:

"$\mu_{0,mix}^{\alpha} = \sum_{t} c_i \mu_{0,i}^{\alpha}; \alpha = 0.28 \frac{S}{S_0}; S = \log_{10} \frac{\mu_{0,max}}{\mu_{0,min}}$" and insert -- $\mu_{0,mix}^{\alpha} = \sum_{t} c_i \mu_{0,i}^{\alpha}; \alpha = 0.28 \frac{S}{S_0}; S = log_{10} \frac{u_{0,max}}{u_{0,min}}$ --

In Column 9, Line 35 approximately, delete Equation 27:

"$n_{p,mix}^{\alpha} = \sum_{t} c_i n_{p,i}^{\alpha}; \alpha = 0.5 \frac{S}{N_0}$" and insert -- $n_{p,mix}^{\alpha} = \sum_{t} c_i n_{p,i}^{\alpha}; \alpha = 0.5 \frac{S}{N_0}$ --